Jan. 30, 1951 E. G. STAUDE 2,539,977
UNLOADING VALVE
Filed Feb. 21, 1946 2 Sheets-Sheet 1
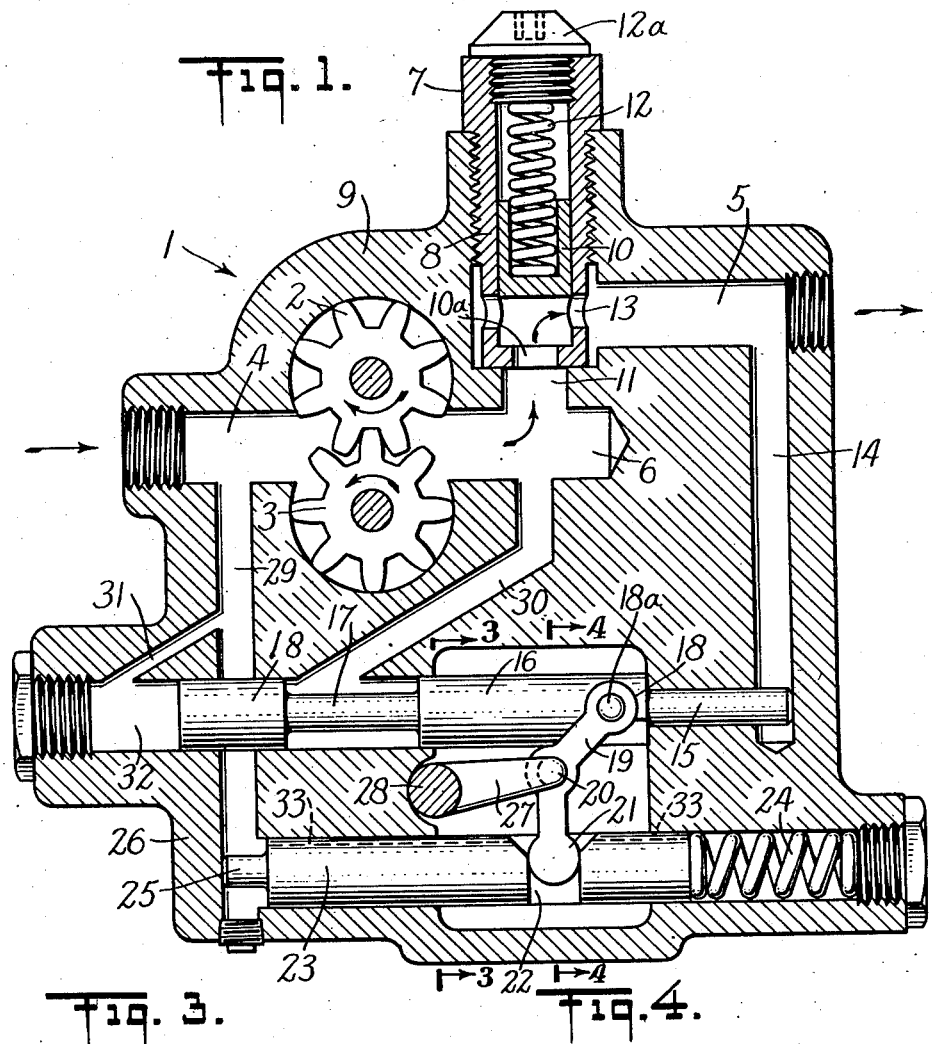
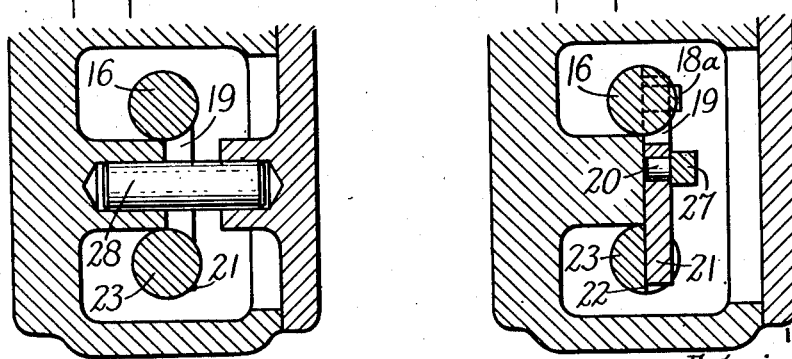
INVENTOR
Edwin G. Staude
BY
Arthur Wright
ATTORNEY INVENTOR
Edwin G. Staude
BY
Arthur Wright
ATTORNEY

UNITED STATES PATENT OFFICE 2,539,977

UNLOADING VALVE

Edwin G. Staude, Minneapolis, Minn.

Application February 21, 1946, Serial No. 649,286

7 Claims. (Cl. 137—153)

My invention relates to unloading valves for fluid pressure pumps and is applicable to any desired type of pump apparatus, such for instance as those used in connection with automobile engines or airplane engines.

One of the principal objects of my invention is to provide an unloading valve to be used in connection with pressure pumps adapted to supply pressure fluid to an accumulator, so arranged that when a maximum desired pressure in the accumulator is obtained the pressure will be relieved quickly on the discharge side of the pump. This is so arranged as to provide a free circulating system for the pump until the time when the demand on the accumulator has reduced the pressure therein sufficiently to again require the supply of pressure liquid thereto. Another object is to provide a valve mechanism which is simple and compact in construction, so that it may be readily incorporated into the pump structure. Still another object is to provide a simple valve mechanism of the piston type and which not only opens and closes quickly but is adapted for mass production.

While my invention is capable of embodiment in many different forms for the purpose of illustration I have shown only one form thereof in the accompanying drawings, in which—

Fig. 1 is a diagrammatic vertical section of my unloading valve shown in the position where the fluid is being delivered to an accumulator;

Fig. 3 is a vertical section on line 3—3 of Fig. 1;

Fig. 4 is a vertical section on line 4—4 of Fig. 1;

Figure 2:
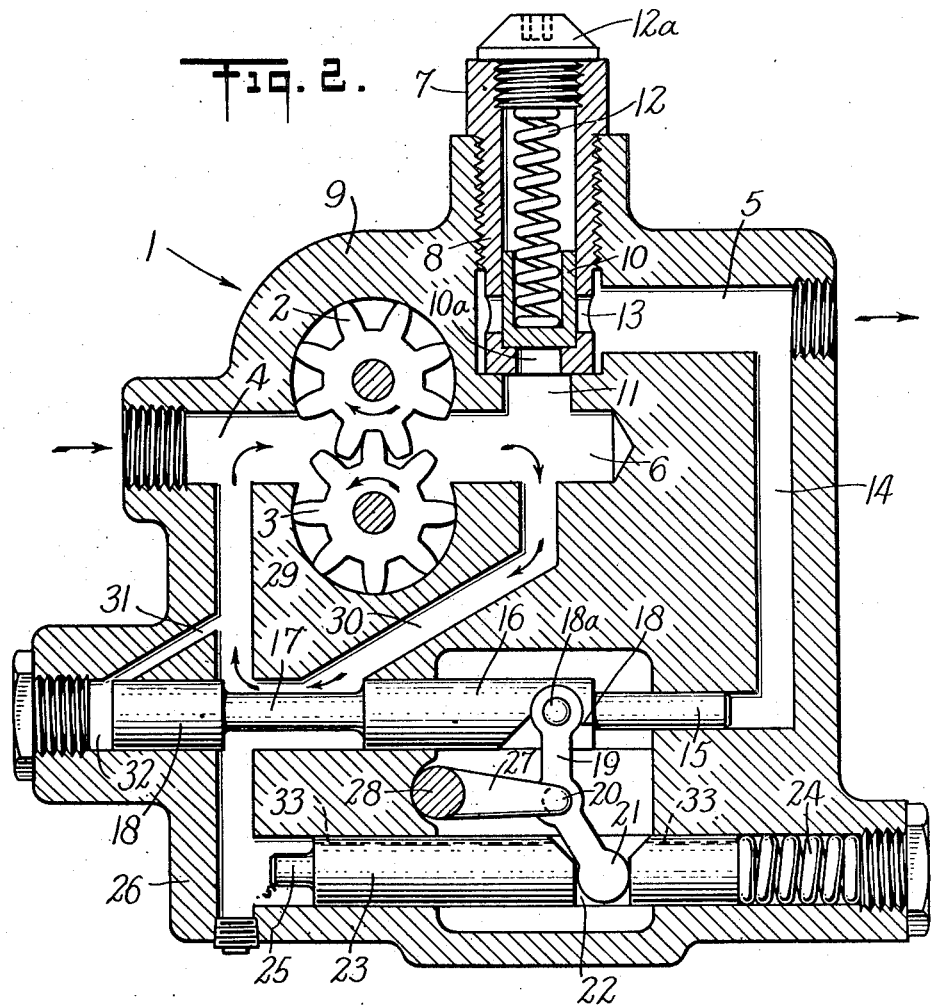
Fig. 2 is a similar view showing the position in which the unloading valve has been moved to the left to open free circulation for the pump and thereby stop the flow of the fluid to the accumulator.

Referring to the drawings, I have shown a pump 1 having a pair of pump gears 2 and 3 therein revolving in the direction shown by the arrows, and which are adapted to draw liquid from an inlet passage 4 and expel the same through a passage 5 to a fluid pressure accumulator (not shown). Adjacent to the pump gears 2 and 3, on the discharge side thereof, there is provided a pressure chamber 6 and a valve 7 which has a sleeve 8 screw-threaded into a pump casing 9. The sleeve 8 has therein a piston 10 adapted to close an opening 10a in the bottom of the sleeve 8 and an opening 11 communicating with the passage 5. The piston 10 is normally forced downwardly to close the opening 10a by means of a suitable spring 12 supported at its upper end against a screw plug 12a in the sleeve 8. The pressure liquid from the chamber 6 is arranged to force the piston 10 upwardly so as to uncover a plurality of openings 13 through the sides of the sleeve 8 so as to discharge the liquid through the passageway 5 and thence to the accumulator. The piston 10 is provided to prevent the reverse flow of the pressure liquid from the passageway 5 to the chamber 6 whenever the pressure in the chamber 6 falls below the pressure in the accumulator.

When the pressure in the accumulator reaches the desired maximum, as for example 1000 lbs. per square inch, the pressure from the accumulator flows down through a passage 14 so as to act against a small piston member 15 which is formed integrally with an enlarged portion 16 followed by a reduced portion 17 and an enlarged valve portion 18 acting to cut off the free circulation of the liquid, when desired. The enlarged portion 16 is, furthermore, provided with a pin 18a formed thereon by a hollow end milling tool, the lower portion 18 of said member 16 being cut away to provide room for a link 19 mounted on the pin 18a, said link having a pivot or fulcrum 20 on said pin 18a and a lower extension 21 fitting into a slot 22 cut into the side of a plunger 23. A spring 24 acts against the end of the plunger 23 to hold it normally against a stop 25 formed by a wall 26 of the pump casing 9. Furthermore, a link 27 is connected to the pivot 20 of the link 19 and said link 27 has a pivotal support 28 in the form of a socket formed within the pump casing 9.

When the piston member 15 starts to move it overcomes the resistance of the spring 24 rapidly and causes a quick movement of the enlarged portion 16 to the left to the point where the enlarged valve 18 uncovers a passage 29, which connects the inlet passage 4 with a passage 30 leading to the chamber 6, because of the presence of the reduced portion 17, when the member 18 is in the position shown in Fig. 2. A suitable venting passageway 31 leads within the casing 9 from a chamber 32 at the end of the valve 18 to the passage 29. Also, suitable grooves 33 are cut along the upper surface of the plunger 23 to relieve any pressure from within the chamber containing the spring 24 which may accumulate owing to seepage, thus draining the same to the passage 29.

Figure 5:
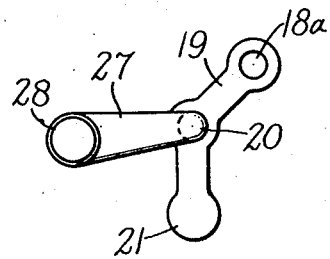
Figs. 5, 6 and 7 are diagrams showing a succession of the positions of the toggle lever arrangement between the valve and the plunger controlling mechanism for the valve.
Figure 6:
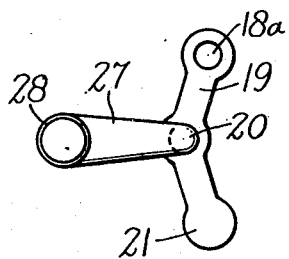
Figure 7:
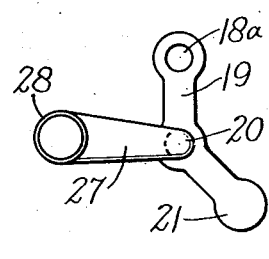

In the operation of the unloading mechanism, when the piston 15 is in the position as shown in Fig. 1, the link member 19 is in the position shown in said figure approximately 45° to the right of the perpendicular line, whereas the link extension 21 is strictly on the perpendicular line so that the leverage is in favor of the spring 24 when the link is in this position. This advantage is about 20%, depending, of course, upon the length of stroke for which the apparatus is designed. Liquid under pressure is, therefore, supplied from the chamber 6 through the passage 5 to the accumulator, but as soon as the pressure within the passage 14, pressing against the piston member 15, increases sufficiently to move the piston member 15 to the left the link 19 on the pin 18a forces the pivot 20 downwardly by the swinging of the link 27 on the pivot 28. The initial position of these parts as shown in Fig. 1 is also the position as shown in Fig. 5. When the movement of the piston member 15 to the left is half-way completed it assumes the position shown in Fig. 6, in which the pressure against the piston 15 by the spring 24 is evenly divided on the two sides of the pivot 20. Immediately, however, that the link member 19 assumes the position shown in Fig. 2, the link advantage is with the piston member 15, which, in the proportion shown in the drawings, is about 20%. While this 20% increase takes place during movement of the piston member 15 from the position shown in Fig. 1 to that of Fig. 2, the 20% leverage increase is also offset by a 20% loss or decrease in the position of the link 21 when it is in the position shown in Fig. 2 and, therefore, there is actually a difference of 40% in the extreme positions of these co-acting members 19 and 21.

The exposed area of the piston 15 has been reduced to ¼" diameter, which has an area of .049 square inch, and which at 1000 lbs. pressure per square inch is moved effectively at 49 lbs. The purpose of this is to reduce the size of the spring 24 and, accordingly, the wear on the bearings of the link connections between the enlarged portion 16 of the piston 15 and the plunger 23.

It will be readily understood that the theory of the operation of my unloading valve is the same as in operating the pedal of a bicycle, where the rider exerts his greatest torque when the pedal arm is at right angles to the direction of the force applied to the pedal.

While I have described my invention above in detail I wish it to be understood that many changes may be made therein without departing from the spirit of the same.

I claim:

1. In combination, an inlet for fluid, a chamber for receiving fluid under pressure, a fluid passage connecting the inlet and chamber, a delivery passageway, a check valve between the said chamber and the delivery passageway, a hydraulic plunger controlling said passage having an extension subject to the pressure in said passageway, a spring-pressed plunger, a lever connection from the spring-pressed plunger to the hydraulic plunger, said lever connection comprising two arms angularly disposed to each other with a pivotal support at the junction thereof so that said arms have, respectively, interchangeable angular positions as to the positions of their respective plungers.

2. In combination, an inlet for fluid, a chamber for receiving fluid under pressure, a fluid passage connecting the inlet and chamber, a delivery passageway, a check valve between the said chamber and the delivery passageway, a hydraulic plunger controlling said passage having an extension subject to the pressure in said passageway, a spring-pressed plunger, and a floating lever connection from the spring-pressed plunger to the hydraulic plunger.

3. In combination, an inlet for fluid, a chamber for receiving fluid under pressure, a fluid passage connecting the inlet and chamber, a check valve between the said chamber and the delivery passageway, a hydraulic plunger controlling said passage having an extension subject to the pressure in said passageway, a spring-pressed plunger, and a floating lever connection from the spring-pressed plunger to the hydraulic plunger, said lever connection comprising two arms angularly disposed to each other with a pivotal support, in the form of a link with a fixed pivot, at the junction thereof.

4. In combination, an inlet for fluid, a chamber for receiving fluid under pressure, a fluid passage connecting the inlet and chamber, a delivery passageway, a check valve between the said chamber and the delivery passageway, a hydraulic plunger controlling said passage having an extension subject to the pressure in said passageway, a spring-pressed plunger, and a lever connection from the spring-pressed plunger to the hydraulic plunger, said passage having a branch passage leading to an end of the spring-pressed plunger.

5. In combination, an inlet for fluid, a chamber for receiving a fluid under pressure, a delivery passageway, a check valve located between the chamber and the delivery passageway, a fluid passage connecting the inlet and chamber, a hydraulic plunger controlling said passage, including a plunger extension exposed to the pressure from the delivery passage for actuating said plunger, a second plunger, a spring for said second plunger, a link connection between said first plunger and said second plunger to induce a quick opening or closing of said plunger valve upon excessive pressure of fluid against said plunger extension.

6. In combination, an inlet for fluid, a chamber for receiving a fluid under pressure, a delivery passageway, a check valve located between the chamber and the delivery passageway, a fluid passage connecting the inlet and chamber, a hydraulic plunger controlling said passage, including a plunger extension exposed to pressure from the delivery passage for actuating said plunger, a second plunger including a spring and a linkage connection with said first plunger urging said first plunger to keep the said fluid passage closed except to excessive pressure against the said plunger extension, said linkage connection having one member of said link pivoted on said first plunger, and said link having a movable fulcrum located between said plungers.

7. In combination, a body member including an inlet passage, a chamber, an outlet passage, a check valve located in the outlet passage for checking the flow of fluid against reverse flow from the outlet passage to said chamber, a plunger having a pressure responsive area in communication with the outlet passage, said plunger having a balanced area connected by a passage to said chamber, a drain passage leading to said chamber, said plunger normally closing said drain passage whereby pressure is normally maintained in said chamber, a second plunger, a spring for said second plunger, said spring urging said second plunger in the opposite direction from the movement of said first mentioned plunger by said pressure responsive area, a positive snap acting link for translating the motion between the two plungers whereby predetermined pressure acting on said pressure responsive area on said plunger will shift said plunger in said opposite direction against said spring, to open thereby the drain passage, and relieve pressure in said chamber.

EDWIN G. STAUDE.

REFERENCES CITED

The following references are of record in the file of this patent:

UNITED STATES PATENTS

| Number | Name | Date |
|---|---|---|
| 725,707 | Hoffman | Apr. 21, 1903 |
| 1,103,037 | Clark | July 14, 1914 |
| 1,110,567 | McAulay | Sept. 15, 1914 |
| 1,663,647 | Brush | Mar. 27, 1928 |
| 1,888,666 | Russel | Nov. 22, 1932 |
| 2,316,445 | Marshall | Apr. 13, 1943 |
| 2,372,016 | Rockwell | Mar. 20, 1945 |